Patented June 1, 1943

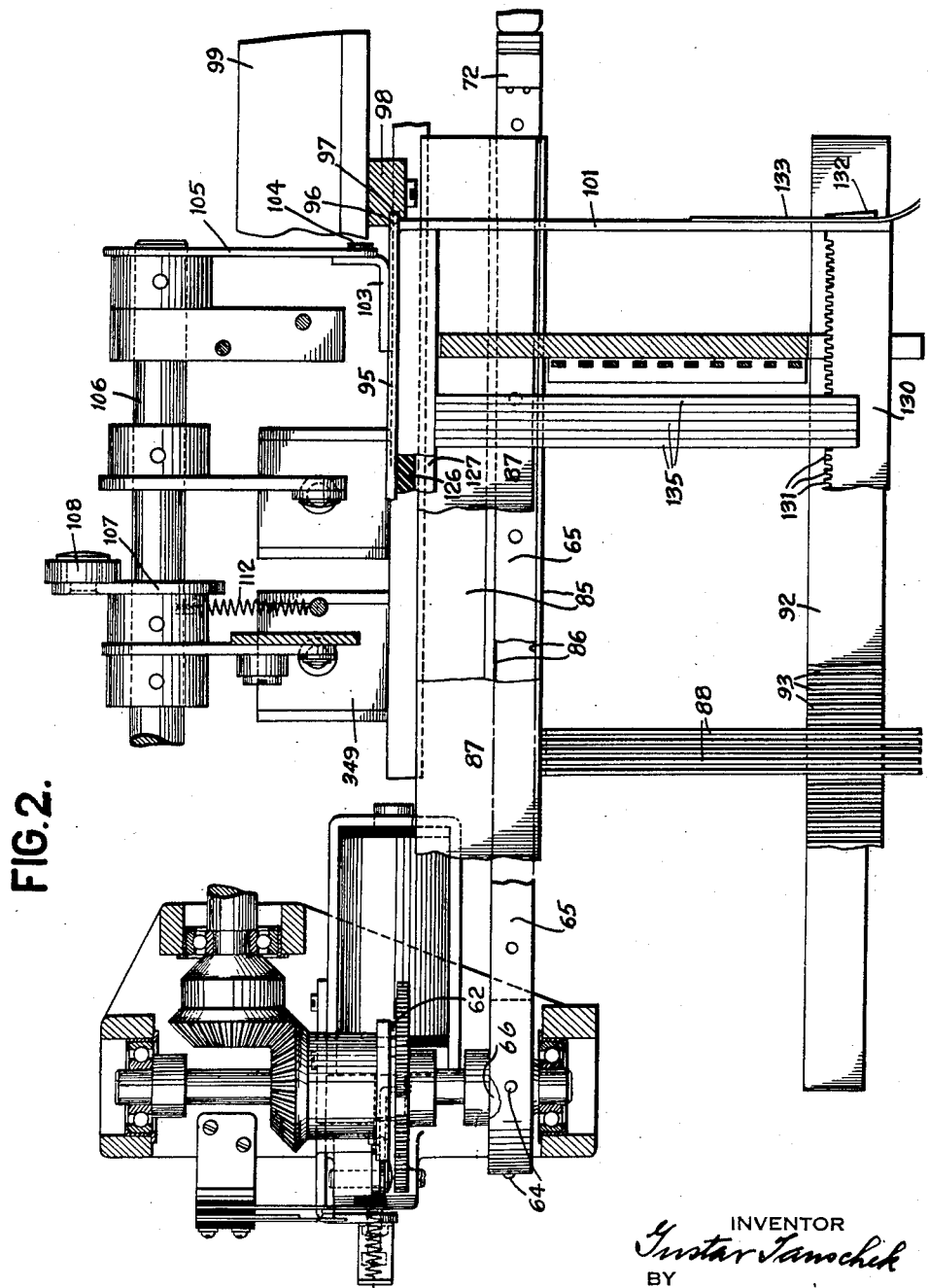

2,320,836

UNITED STATES PATENT OFFICE 2,320,836

SENSING MECHANISM

Gustav Tauschek, Vienna, Germany, assignor to International Business Machines Corporation, New York, N. Y., a corporation of New York Original application June 24, 1936, Serial No. 86,920. Divided and this application November 13, 1940, Serial No. 365,531

3 Claims. (Cl. 235—61.11)

This invention relates to card controlled calcuating machines and particularly to the type in which tabulating cards are analyzed at rest and while in analyzing position the cards are adapted to control calculating operations of different types.

This application is a division of the application in the name of G. Tauschek, Serial No. 86,920, filed June 24, 1936, now Patent No. 2,224,774, dated December 10, 1940. In the present application, the disclosure and claims are restricted solely to improvements in the analyzing mechanisms.

With regard to the improvements in analyzing devices for analyzing a card at rest, it is explained that in the present state of the art such analyzing devices usually include a reciprocable frame which carries a plurality of analyzing elements. The cards are provided with a plurality of columns and obviously in order that any column may control an entry operation, the frame must be provided with a number of sets of analyzing elements which are commensurate with the number of card columns. This construction of the machine has resulted in a unit which is quite heavy, requires considerable amount of power to operate, and also resulted in further complications in the machine.

With this disadvantage in view, it is the main object of the present invention to provide an analyzing mechanism which consists of a plurality of separate analyzing units, each unit consisting of a plurality of analyzing elements. To attain the desirable end that only such elements be utilized which are consistent in number with the controlling columns, it is a further specific object of the invention to provide a simple and effective means whereby the analyzing units may be readily attached to, and conversely, detached from the frame which supports the analyzing units.

With the last mentioned specific object in mind, a still further object of the present invention is to provide such attaching means which is in the nature of electrical connections to digit impulse transmitting bars to which timed digit representing impulses are transmitted so as to effect the entry operation.

In more detail, each analyzing unit is provided with a plurality of analyzing brushes which are so spaced that they are correlated with the index point positions of a related card column. From these analyzing brushes there are extended conducting pins which are adapted to be received by holes in the digit representing bars. In this manner, permanent and efficient electrical connections are made between the analyzing elements and the digit representing bars, and when the units are in their attached position they are adapted to receive like movements imparted to the supporting frame.

In the appended drawings of the following specification, the novel analyzing devices of the present invention are to be used in connection with calculating mechanisms of different types which are shown in the aforementioned Patent No. 2,224,774, to which recourse may be had for a disclosure of such calculating mechanisms. It is to be understood, however, that the present disclosure should be considered as illustrative and not restrictive since features of the present invention may be applied to other forms of card controlled machines without departing from the spirit of the invention.

Other objects of the invention will be pointed out in the following description and claims and illustrated in the accompanying drawings which disclose by way of example, the principle of the invention and the best mode, which has been contemplated of applying that principle.

In the drawings:

Fig. 2 is a fragmentary plan view of the mechanism shown in Fig. 1 and shows the construction of the analyzing frame and the locking means for holding the analyzing units in assembled position.

Card feeding mechanism

Figure 1:
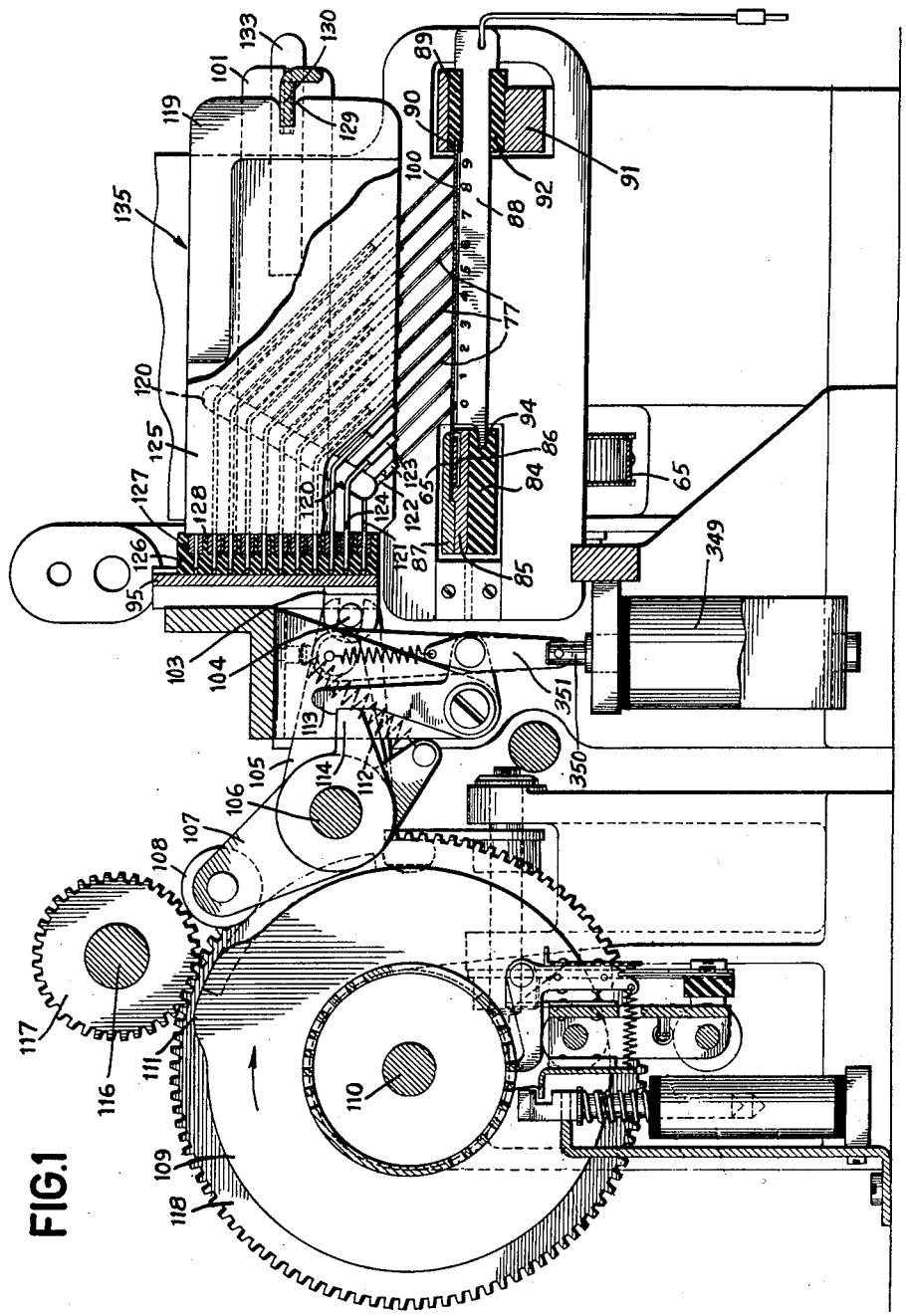
Fig. 1 is a transverse sectional view which shows the construction of one of the detachable brush units and the manner in which it is attached to the digit representing bars for electrical connection therewith and simultaneously causing its position over the index points of the card to be analyzed. This view shows the analyzing frame in operated position and the associated operating mechanism.

The card feeding mechanism for feeding the cards from the card supply hopper to the analyzing mechanism and then from the analyzing mechanism is fully shown and described in the patent to Tauschek, No. 2,224,774, part of it being identified herein which consists of a tape 65 which is driven by a sprocket wheel 66. The sprocket wheel 66 has radial projections 64 engaging holes in the tape 65 and the latter also carries a card picker 72. During each cyclic operation of the card feeding mechanism, the picker 72 engages the card and feeds it from the hopper to a position beneath the analyzing mechanism.

When a tabulating card 100 is fed out of the hopper the leading edge of the card passes to the left and the card in its travel to the left is guided by guiding means fully shown and described in the aforementioned patent, some of which are shown herein.

*Card guiding means*

Referring to Fig. 1, it will be noted that there is provided a longitudinal bar 84 of insulating material supported by the frame of the machine. Attached to the bar 84 is a longitudinal metal plate 85 provided with a recess 86 in which the card feeding tape 65 travels. Rigidly secured to the plate 85 is a longitudinal plate 87 which is cut underneath longitudinally so that with respect to the upper surface of the feeding tape 65 there is formed a slot adapted to receive the tabulating card 100. The card is adapted to travel in a plane beneath the brushes 77 by passing over a series of spaced tracks 88. A bar 89 of insulating material is provided with a tongue 90 providing a space above tracks 88 to further guide the edge of the card in transverse movement and keep it in alignment with brushes 77.

A series of tracks 88 are provided, one for each card column and they are preferably mounted by the following construction. Attached to a stationary plate 91 is a bar 92 of insulating material provided with longitudinal slots 93 adapted to receive the tracks 88 which are constructed of some desirable metal of high electrical conductivity. The bar 89 is provided with slots similar to slots 93 of the bar 92 and are aligned therewith so that when the bars 90 and 92 are supported and spaced apart in the manner shown in Fig. 1, slots are provided for holding the tracks 88 in proper position and insulated from each other.

The rear portions of the metallic tracks 88 are received by a series of slots 94 formed in the bar 84 so as to rigidly hold the metallic tracks 88 at their rear ends and spaced apart from each other. One track 88 is provided for each controlling card column, there being guiding means for eighty tracks for a corresponding number of card columns of the tabulating card.

*Analyzing means*

Associated with each track 88 is a brush unit 135 comprising a series of ten flexible wire brushes 77 which are adapted, when the card is in the analyzing position, to be pressed against the card whereby the brush 77 positioned over the perforation in the column will pass through the perforation and make an electrical contact with the related track 88.

A suitable framework is provided to carry all the brush units 135 which are manually placed in operative position and to further cause the brushes to partake of a reciprocating movement. This framework comprises a transverse plate 95 provided with ears 96 adapted to fit in slots 97 of guide bars 98, attached to a cross bar 99 comprising part of the machine framework. Fig. 2 shows the structure for guiding the plate 95 in its reciprocating movement at its right end and precisely the same construction is used for guiding the frame at its left end. The plate 95 is provided with integral side arms 101. It is obvious from the preceding description that the transverse plate 95 and side arms 101 comprise a yoke-shaped framework which is slidably mounted.

In order to effect a downward movement of the framework the following mechanism is preferably mounted. The transverse plate 95 carries at each end, as shown in the drawings for one end, a bracket 103 provided with a pin 104 adapted to receive the open slot of an arm 105 secured to a rock shaft 106. Attached to the rock shaft 106 is an arm 107 provided with a roller 108 adapted to cooperate with a profile cam 109 secured to a drive shaft 110. In the normal condition of the machine the brush carrying framework is in its upward position with the brushes 77 above the metal tracks 88 at which time the roller 108 rests on the circular part of the cam 109. During the initial rotation of the cam in a clockwise direction and after the card has been fed beneath the analyzing brushes 77 the cam portion will rock the arm 107 against the action of a spring 112, thereby depressing the brush carrying framework downwardly and when it is in a depressed position as shown in Fig. 1 it will be held by means of a spring-pressed latch pawl 113 latching over an arm 114 secured to the shaft 106.

Normally the roller 108 rests against the low part of cam 109 and during each cyclic operation of the machine as more fully disclosed in the aforementioned patent a shaft 116 is rotated to rotate a pinion 117 which meshes with a gear 118 secured to the shaft 110.

The cam 109 is repeatedly rotated during the calculating operation in the clockwise direction but when the cam depresses the analyzing frame the first time the latch pawl 113 will hold the frame in depressed position with the analyzing brushes 77 pressed against the card so as to enable the brushes to control the calculating operation.

As more fully described in the aforementioned patent, at the end of the calculating operation an impulse is directed to a brush release magnet 349. The latter through its movable core 350 and link 351 rocks the latching pawl 113, thereby disengaging it from the arm 114 which is secured to the shaft 106. Under the action of the spring 112 the brush supporting frame can now be elevated so that the analyzing brushes 77 are now out of contact with the tracks 88.

*Construction of brush analyzing unit*

The form of construction of each brush unit 135 and the means whereby the various brush units 135 are carried by the brush carrying framework will now be described. Each unit 135 comprises a plate 119 of insulating material which is provided with a diagonal cut or recess 120. In the process of manufacture, a series of horizontal cuts 121 are made in the plate 119 and diagonal cuts 122 are also made, both of which terminate into the diagonal cut 120. Thus, a continuous recess is formed so as to receive a related brush holder 123 and an electrical contact pin 124 fitted within said holder. The brush holders and pins are differently shaped and bent so as to be received by its appropriate recess to provide a series of spaced brushes 77 spaced apart and corresponding to the index points of a column of a tabulating card and to cause the conducting pins 124 to be spaced so that each row of conducting pins extends in a vertical plane. When the brush holders and associated pins are assembled within the plate 119 they are substantially flush with its surface so that they may be held in assembled position by means of an attached cover plate 125.

It will be seen that the transverse plate 95 carries a longitudinal bar 126 of insulating material suitably cut longitudinally so as to receive ten metallic bars 127. Adjacent bars are preferably insulated from each other by means of longitudinal strips 128 of insulating material.

A plurality of series of holes in each of the ten bars 127 is provided and each series is aligned vertically so as to receive the conducting pins 124 of a related brush unit. In order to further receive the conducting pins 124, the insulating bar 126 is provided with holes which are aligned with respect to the holes of series of bars 127. The bars 126, 127 and separating insulating strips 128 may be conveniently held by the plate 95 by any suitable means.

When certain columns of the tabulating card are adapted to control calculating operations the associated brush units 135 are positioned so that the conducting pins 124 thereof are received and held by the brush carrying framework in the manner just described. It will also be recalled that for each card column a tabulating card is provided with ten index points, 0-9, inclusive. It will thus be obvious that by the provision of the ten bars 127, all of the brushes related to the same index points of a plurality of columns are electrically connected by the related bar 127. However, the metal tracks 88 are insulated from each other so that only the brush 77 which passes through the particular perforation of a column will be effective in an electrical circuit for control purposes.

The bars 127 may be considered as digit impulse transmitting bars because, as described in the aforementioned Patent No. 2,224,774, an impulse emitter is correlated with the bars 127 to direct at differential times electrical impulses representative of each of the digits. Therefore, all of the brushes 77 which analyze a perforation at the same index point position will receive through the common bar 127 the same digit impulse. It is pointed out that the positioning of the brush unit so that the pins 124 are received by the bars 127 will simultaneously dispose the analyzing brushes over the respective index point positions of the card.

In order to further hold the brush units 135 in adjusted position to the brush carrying framework, each of the brush units 135 and the side arms 101 of the yoke-shaped frame is provided with a slot 129 adapted to receive a locking plate 130. The locking plate 130 is provided with a plurality of slots 131 for receiving the forward edges of the brush units 135 placed in operative position, thus spacing them apart. When the locking bar 130 is manually inserted so as to enter the slots 129 of the brush units 135 and the side arms 101, a portion 132 projecting outside of the plate 101 will be received by an aperture of a spring plate 133 attached to each of the plates 101, the aperture corresponding to the sectional outline of the projecting portion 132. It is evident that a similar locking means is provided for the left end of the plate 132 which is fully shown in the Patent No. 2,224,774.

Obviously, the columns of the card which are to be analyzed are analyzed by the brush units 135 placed at such column positions and for those columns which are not to be analyzed brush units 135 are not necessary, and since they are not assembled on the reciprocating frame the weight of the latter is reduced to avoid unnecessary expenditure of power.

While there have been shown and described and pointed out the fundamental novel features of the invention as applied to a single modification, it will be understood that various omissions and substitutions and changes in the form and details of the devices illustrated and in its operation may be made by those skilled in the art without departing from the spirit of the invention. It is the intention therefore to be limited only as indicated by the scope of the following claims.

What is claimed is:

1. An analyzing arrangement for a machine controlled by a perforated record provided with a plurality of columns of index points comprising, a plurality of insulated digit impulse transmitting bars, one for each index point position, and wherein at each card column each bar is provided with an aperture to thereby provide by all of said bars at each record column position a series of aligned apertures, a brush support plate of insulating material provided with analyzing brushes projecting exteriorly of one edge of the support plate for analyzing the series of index points of the record column correlated with the brushes, and means for attaching the support plate to the series of impulse transmitting bars at the column position desired comprising contact pins integrally connected to each of the brushes and projecting exteriorly from another edge of the support plate, whereby the insertion of such contact pins in the series of apertures of the bars at the column to be analyzed electrically connects the brushes to the respective impulse transmitting bars and simultaneously disposes each analyzing brush over the related index point position to be analyzed.

2. An analyzing arrangement for a machine controlled by a perforated card provided with a plurality of columns of index points comprising, a reciprocable frame, a plurality of insulated digit impulse transmitting bars carried by said frame, one for each index point position, and wherein at each card column each bar is provided with an aperture to thereby provide by all of said bars at each card column position a series of aligned apertures, a brush support plate of insulating material provided with analyzing brushes projecting exteriorly of one edge of the support plate for analyzing the series of index points of the card column correlated with the brushes, and means for attaching the support plate to the series of impulse transmitting bars to cause the support plate to be carried by the reciprocable frame at the card column position desired comprising contact pins integrally connected to each of the brushes and projecting exteriorly from another edge of the support plate, whereby the insertion of such contact pins in the series of apertures of the bars at the card column to be analyzed electrically connects the brushes to the respective impulse transmitting bars and simultaneously disposes each analyzing brush over the related index point position to be analyzed.

3. An analyzing arrangement for a machine controlled by a perforated card provided with a plurality of columns of index points comprising a reciprocable frame, a plurality of insulated digit impulse transmitting bars carried by said frame, one for each index point position, and wherein at each card column each bar is provided with an aperture to thereby provide by all of said bars at each card column position a series of aligned apertures, a brush support plate of insulating material provided with analyzing brushes projecting exteriorly of one edge of the support plate for analyzing the series of index points of the card column correlated with the brushes, means for attaching the support plate to the series of impulse transmitting bars to cause the support plate to be carried by the reciprocable frame at the card column position desired comprising contact pins integrally connected to each of the brushes and projecting exteriorly from another edge of the support plate, whereby the insertion of such contact pins in the series of apertures of the bars at the card column to be analyzed electrically connects the brushes to the respective impulse transmitting bars and simultaneously disposes each analyzing brush over the related index point position to be analyzed, a bar provided with a plurality of slots, there being a slot for each card column position in which fits, at still another edge, the brush support plate at the desired card column position, and means for attaching the slotted bar to the frame to lock the brush support plate in analyzing position.

GUSTAV TAUSCHEK.